Dec. 17, 1957   M. DISHAL ET AL   2,817,082
CONTINUOUS WAVE BEACON SYSTEM
Filed June 4, 1954
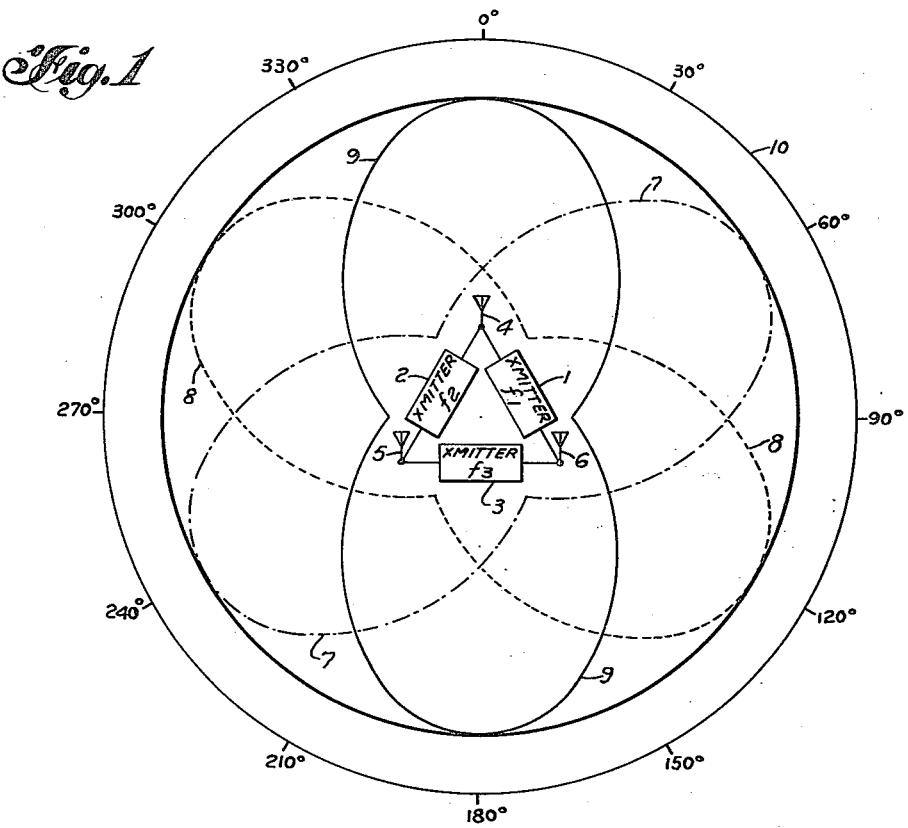
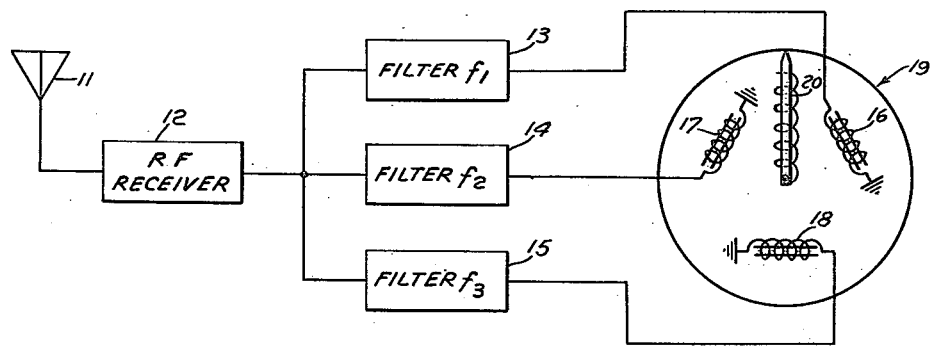
INVENTORS
MILTON DISHAL
MORTIMER ROGOFF
BY
ATTORNEY

… … …

United States Patent Office 2,817,082
Patented Dec. 17, 1957

2,817,082

CONTINUOUS WAVE BEACON SYSTEM

Milton Dishal and Mortimer Rogoff, Nutley, N. J., assignors to International Telephone and Telegraph Corporation, Nutley, N. J., a corporation of Maryland Application June 4, 1954, Serial No. 434,499

6 Claims. (Cl. 343—106)

This invention relates to radio beacon systems and more particularly to long range radio beacon systems of the generally omni-directional type.

It has been proposed that for reliability over long distances, radio beacon systems be provided operating at relatively low frequencies and with relatively narrow sidebands. Such types of radio beacon systems have been disclosed by way of example in U. S. Patent No. 2,541,040 issued February 13, 1951, to R. I. Colin; No. 2,524,765 issued October 10, 1950, to H. G. Busignies and P. R. Adams and in Patent No. 2,510,065 issued June 5, 1950, to H. G. Busignies, P. R. Adams and R. I. Colin. In this general type of system it has been shown that very high reliability with reasonable power consumption may be expected if the system operates in a low frequency region from, for example, 70–100 kilocycles and utilizes extremely narrow modulation bands.

In the systems described in the above-identified patients, the signals emitted by the beacon are sequential in nature and therefore a synchronizing signal is included in order to enable the receiver to identify the beginning of any sequence. In the cooperating receiver equipment used in conjunction with a beacon radiating sequential type signals some form of switching has to be provided in order to route each of the sequential signals to the proper circuitry. It is clearly preferable to provide a radio range beacon system of the type wherein no synchronizing signal need be transmitted. It is also preferable to provide receiver apparatus which is capable of detecting the various radiation patterns without the necessity of switching parts of the transmitted signal to different portions of the receiver circuitry.

It is an object of our invention to provide a radio range beacon system which will be substantially omni-directional and operable at low radio frequency ranges wherein energy is transmitted continuously at different amplitude levels in different sectors about the beacon and receiver means are provided from determining the ratio of energy of the different levels and utilizing this ratio to indicate azimuth.

Another object of our invention is to provide a radio beacon system which need not transmit synchronizing signals.

It is a further object of our invention to provide a navigation receiver of a simple type, for use with a radio beacon of the type propagating energy simultaneously in differently directed radiation patterns, in which means are provided to select portions of energy from a plurality of such radiations and compare the energy to indicate the azimuth position of the receiver with respect to the beacon.

It is still a further object of our invention to provide a simple and reliable radio beacon system operative over relatively long ranges wherein signals of narrow bandwidth may be utilized to produce indications of the relative angular position of the receiver with respect to a beacon and in which the receiver equipment does not require any synchronizing or switching circuitry.

In accordance with a feature of our invention, we provide a radio beacon consisting essentially of three transmitting antennas arranged at the apices of an equilateral triangle. Three transmitters, each operating at a distinctive frequency, simultaneously energize the antennas in pairs so that distinctive distribution of the energy is produced in different angular sectors of a circle about the beacon and the radiation patterns are frequency distinguishable, each of the distinctive frequencies being radiated by a pair of antennas. The amplitudes and phases of the energies fed to the antennas are adjusted so an approximate figure 8 pattern is obtained and the relative amplitudes of the three figure 8 patterns from the three pairs of antennas yield an azimuth indication.

Another feature of this invention is the relatively simple air-borne receiver equipment which is required to co-operate with the transmitting beacon. In one embodiment the azimuth indicating receiver comprises means to detect the transmitted signals whose output is coupled to a plurality of frequency filters so that the different radiation patterns may be separated. The energy from each of the separate radiation patterns is coupled to a separate field coil in a resolver and the position of balance of the resolver rotor yields an indication of azimuth.

The above-mentioned and other features and objects of this invention will become more apparent by reference to the following description taken in conjunction with the accompanying drawings, in which:

Fig. 1 illustrates the general setup of a radio beacon in accordance with our invention together with the field pattern distribution which may be expected for one embodiment of the radio beacon; and, Fig. 2 is a schematic diagram in block form of one embodiment of a receiver incorporating the features of our invention.

Turning first to Fig. 1, one embodiment of a radio beacon transmitter in accordance with the principles of our invention is represented as comprising three transmitters 1, 2 and 3. Each transmitter generates a distinctive frequency so that transmitter 1 operates at frequency $f_1$ and transmitter 2 generates frequency $f_2$ and transmitter 3 generates frequency $f_3$. Also provided at the ground beacon site are three antennas 4, 5 and 6 energized simultaneously in pairs by the transmitters 1, 2 and 3, thus frequency $f_1$ is radiated from antennas 4 and 6 and frequency $f_2$ is radiated by antennas 4 and 5 and frequency $f_3$ is radiated by antennas 5 and 6. The three frequencies being transmitted simultaneously. Since it is advantageous to utilize the low frequency range portion of the spectrum the frequencies $f_1$, $f_2$ and $f_3$ may be centered, for example, about a frequency of 90 kilocycles and have a separation of 50 cycles between each of the transmitted frequencies. The three antennas 4, 5 and 6 are so located as to form an equilateral triangle.

Referring again to Fig. 1, there are represented typical field patterns which may be produced by the radiations from antennas 4, 5 and 6. Referring to the radiation from antenna pair 4 and 6, the radiation pattern generated by the signals transmitted at frequency $f_1$ are shown by pattern lines 7. Simultaneously antennas 4 and 5 energized by frequency $f_2$ will produce pattern 8 and antennas 5 and 6 energized by $f_3$ will produce pattern 9. Thus, it will be seen that as indicated by scale 10 that a difference in amplitude ratio of energy from patterns 7, 8 and 9 are produced about the beacon. A 180° ambiguity exists, but this can be resolved readily by ascertaining the general geographic position of the receiver or it may be resolved by direction finding on two or more beacons or other radiation points or by any other means to locate generally the position of the receiver.

Referring to Fig. 2, the operation of the radio beacon may be more clearly understood by explanation of the receiver arrangement shown therein. In one embodiment of the receiver, which cooperates with the radio range beacon system of this invention shown in Fig. 1, may be mounted on any mobile craft or other location at which it is desired to ascertain the azimuth position relative to the beacon. Such a receiver is shown to comprise an omni-directional antenna 11 coupled through a radio-frequency receiver unit 12 to an associated azimuth indicating means. Obviously, the radio-frequency receiver 12 must have a frequency passband wide enough to accept all the transmitted frequencies. Since in one example the three frequencies $f_1$, $f_2$, $f_3$ may comprise 90,050 cycles, 90,000 cycles and 89,950 cycles, respectively, it is seen that a receiver 12 having a passband wide enough to accept all three frequencies is readily available. Preferably, receiver 12 is tunable so that it may be tuned to different transmitting stations and does not have to be restricted to cooperating with any single beacon. The receiver 12 may be of the superheterodyne type and the output energy is coupled to three frequency filters 13, 14 and 15. Each filter is designed to pass only the energy trasmitted by a single pair of transmitting antennas, thus filter 13 may be a filter tuned to 90,050 or frequency $f_1$ while filter 14 may pass only energy of frequency $f_2$ and filter 15 pass energy only of $f_3$. The outputs of the filters may be coupled to a comparator, for example, the output of filter 13 is coupled to the first stator coil 16 of resolver 19. The outputs of filters 14 and 15 are coupled to stator coils 17 and 18, respectively. The indicator portion 20 of resolver 19 may be coupled to the rotor and will detect a position relative to the stator coils dependent upon the resultant energy level within coils 16, 17 and 18. A scale may be provided so that pointer 20 will indicate the azimuth of the receiver relative to the beacon. Many forms of comparators are capable of cooperating with the receiver of this invention. One form of comparator for operation with an alternating output is described in copending application Serial Number 382,934 filed September 29, 1953, assigned to the same assignee as this application.

It will be clear by reference to Fig. 1 that the spacing between antennas 4, 5; 4, 6; 6, 4 preferably should be less than one-half wavelength since it is desirable that the energy level should not drop to zero at any point. However, the spacing between the antennas also is preferably greater than one-quarter wavelength at the operating frequency since it is essential for the proper operation of the system that considerable contrast between amplitude levels be obtained.

It will be readily understood that while we have shown the simplest form of system in which each of the successive pairs of antennas constitute units of the same equilateral triangular array, separate and independent pairs of radiators may be used if desired. The principles of distribution of energy would be the same whether or not the identical antennas are used as shown. Furthermore, many different types of equipment may be used without departure from the scope of our invention as described herein. The various units indicated by blocks in the diagram have not been shown in detail since many forms of equipment to perform each of these functions are available and are known to those skilled in the art.

While we have described above the principles of our invention in connection with specific apparatus, it is to be clearly understood that this description is made only by way of example and not as a limitation to the scope of our invention as set forth in the objects thereof and in the accompanying claims.

We claim:

1. A radio beacon system comprising a radio beacon including three antennas spaced each from the others, three transmitters each operative at a different frequency and means for simultaneously energizing a different pair of said antennas from each of said transmitters, whereby three directive overlapping patterns each produced from energy at a different frequency are radiated.

2. A radio beacon system comprising a radio beacon including three antennas spaced each from the others, three transmitters each operative at a different frequency, means for simultaneously energizing a different pair of said antennas from each of said transmitters, whereby three directive overlapping patterns each produced from energy at a different frequency are radiated, mobile receiver means, means at said receiver for detecting said transmitted energy, means for separating said plurality of frequencies to obtain the respective energies defining the different radiation patterns and means for comparing the amplitude of the energies of said radiation patterns to provide an indication of direction.

3. A radio beacon system comprising a radio beacon having a plurality of transmitters and a plurality of antennas for simultaneously transmitting energy at more than two different amplitude levels in different sectors about said beacon at more than two different frequencies, said amplitude levels varying differently in ratio over different sectors and receiver means for receiving said energy, separating means at said receiver for selecting the energy in accordance with frequency at said amplitude levels and means to compare the relative amplitudes of the separated energy to indicate azimuth position of said receiver within a given sector.

4. A radiation beacon system comprising a beacon having a plurality of transmitters and a plurality of antennas for simultaneously radiating energy in more than two differently directed overlapping radiation patterns, the energy of each of said radiation patterns being transmitted at a separate frequency, whereby ratios of energy level of the different radiation patterns differ with changes in azimuth about the center of radiation of the beacon, receiver means for receiving the radiated energy from said beacon, means responsive to said frequency differences for selecting received energies from at least two of said radiation patterns and means responsive to said separated energies for comparing the amplitudes thereof and thereby determine the azimuth location of said receiver with respect to said beacon.

5. A radio beacon system comprising a radio beacon including three antennas spaced apart at the apices of a triangle, three transmitters each operative at a different frequency and means for simultaneously energizing a different pair of said antennas from each of said transmitters, whereby three directive overlapping patterns each produced from energy at a different frequency are radiated.

6. A radiation beacon system comprising a beacon having three transmitters, three antennas spaced apart at the apices of a triangle and means coupling each of said transmitters to a different pair of said antennas for simultaneously radiating energy in three differently directed overlapping radiation patterns, the energy of each of said radiation patterns being transmitted at a separate frequency, whereby ratios of energy level of the different radiation patterns differ with changes in azimuth about the center of radiation of the beacon, receiver means for receiving the radiated energy from said beacon, means responsive to said frequency differences for selecting received energies from said radiation patterns and means responsive to said separated energies for comparing the amplitudes thereof and thereby determine the azimuth location of said receiver with respect to said beacon.

References Cited in the file of this patent

UNITED STATES PATENTS

| | | |
|---|---|---|
| 1,002,141 | Fessenden | Aug. 29, 1911 |
| 1,183,802 | De Forest | May 16, 1916 |
| 2,204,438 | Neufeld | June 11, 1940 |
| 2,288,815 | Luck | June 7, 1942 |
| 2,471,470 | Wilkie et al. | May 31, 1949 |
| 2,485,612 | Labin et al. | Oct. 25, 1949 |
| 2,541,040 | Colin | Feb. 13, 1951 |